July 31, 1928.

H. A. BOIES

SEAT BACK

Filed April 4, 1927

1,679,238

WITNESSES

INVENTOR
Henry A. Boies
BY
ATTORNEY

Patented July 31, 1928.

1,679,238

UNITED STATES PATENT OFFICE.

HENRY A. BOIES, OF MIDDLEBURY, VERMONT.

SEAT BACK.

Application filed April 4, 1927. Serial No. 180,819.

My invention relates to a seat back, and more especially to a seat back having means to attach it to a boat seat or to a board seat in a field stand, or the like.

The invention has for its general object to provide for readily attaching the seat back to the board seat in a manner to securely hold the back in position.

One of the more specific objects of the invention is to provide a seat back of the indicated character adjustable relatively to the clamping means so that the back may be given a particular angle or inclination and its bottom edge then made to conform to the angle of adjustment so that the bottom edge surface of the seat back will come to a firm bearing against the top of the seat.

The nature of my invention and its distinguishing features and advantages will more clearly appear as the description proceeds.

Reference is to be had to the accompanying drawings forming a part of this specification, it being understood that the drawings are merely illustrative of one example of the invention.

Figure 1:
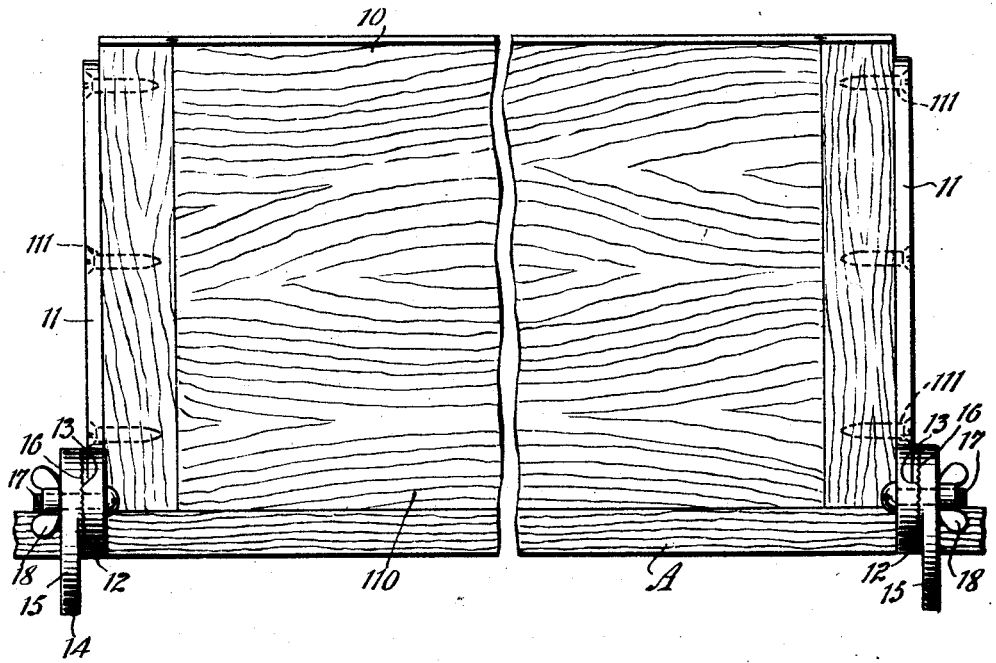
Figure 1 is a rear view of a seat back embodying my invention, showing the same applied to a board seat.

In carrying out my invention in accordance with the illustrated example, the back 10 of any approved form and material is provided at the side edges with straps 11 secured by suitable fasteners, such as screws 111. The lower end of each strap 11 is deflected rearwardly beyond the rear surface of the seat back 10, the outer side surface of said extension 12 having an annular series of serrations or equivalent roughness of surface, as indicated at 13.

A clamp element 14 is provided at each end of the back 10, and at its rear end it has a broadened upwardly extending member 15, formed with serrations 16 or their equivalent to engage the serrations 13. A bolt 17 is passed through each rearward extension 12 of the straps 11 and through the head or enlarged extension 15 of the clamp 14, said bolt being provided with a wing nut 18, or other nut, to bind the extensions 12 and 15 into close relation, with the serrations 13 and 16 interlocked.

Figure 2:
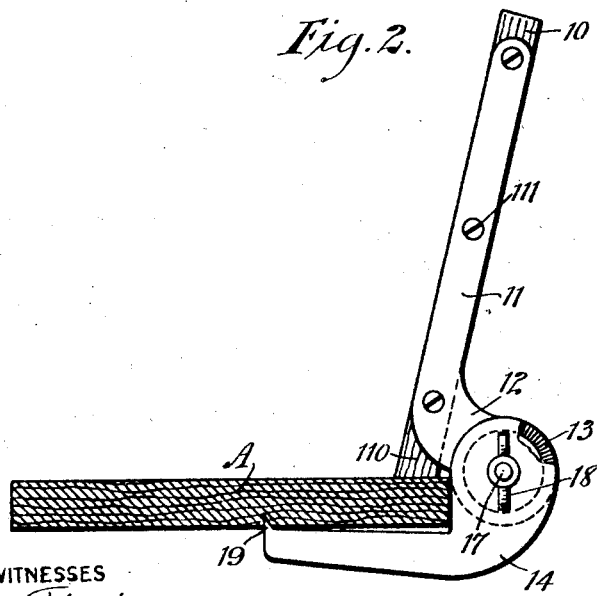
Figure 2 is an edge view of my improved seat back.

The clamp 14 extends forwardly beyond the vertical plane of the straps 11, and at the forward end of each clamp 14 is means for engaging the seat board A of a boat or field stand at the under side, the engaging members in the illustrated form being in the form of a spur 19. The serrations 13, 16, and the bolt and nut 17, 18, provide for adjusting the angle of the straps 11 secured to the back 10 for varying the inclination of said back 10. With the desired adjustment made, the bottom edge of the back 10 is given a bevel to suit the adjustment referred to, so that the under surface of the lower end of the back will conform to the plane of the top of the seat board A for effecting a firm bearing of the seat back against the seat board A. It will be noted particularly from Figure 2 that the seat back 10 extends at the lower edge below the extensions 12 at the lower end of the straps 11. In this way the clamping is effected by the seat back 10 coacting with the clamp 14 to firmly grip at the top and bottom the seat board A.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A seat back, comprising a back member, a pair of end members secured to said back member at the side edges thereof, said side members having rearward extensions at their lower ends, a clamp for each of said side members extending forwardly, and means adjustably connecting said extensions to said clamps, the lower portion of said back member below said elements thereon being adapted to bind against the top of a seat board to which the seat back is secured so as to coact with the clamps in holding the seat back in position on the seat board.

2. A seat back, comprising a back member, a side member secured to each edge of said back member, each of said side members having an apertured rearwardly extending section positioned so that the aperture will be substantially in line with the lower end of said back member, a clamp for each of said side members, each of said clamps comprising a body having a seat engaging member at one end and a clamping extension at the other end, said extension projecting at right angles to said body so as to engage the rear edge of a seat when the device is in use, and a bolt for each of said clamping extensions, each bolt extending through the respective extensions on said side members and through said clamping extensions for clamping the clamps to said side members.

HENRY A. BOIES.